(12) United States Patent
Klocke et al.

(10) Patent No.: US 12,188,144 B2
(45) Date of Patent: Jan. 7, 2025

(54) WAFER IMMERSION IN SEMICONDUCTOR PROCESSING CHAMBERS

(71) Applicant: Applied Materials, Inc., Santa Clara, CA (US)

(72) Inventors: John L. Klocke, Kalispell, MT (US); John Igo, Kalispell, MT (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 17/589,051

(22) Filed: Jan. 31, 2022

(65) Prior Publication Data

US 2023/0243059 A1 Aug. 3, 2023

(51) Int. Cl.
| | | |
|---|---|---|
| *C25D 7/12* | (2006.01) | |
| *C25D 17/00* | (2006.01) | |
| *C25D 21/12* | (2006.01) | |
| *G05B 13/02* | (2006.01) | |

(52) U.S. Cl.
CPC ............. *C25D 7/12* (2013.01); *C25D 17/001* (2013.01); *C25D 21/12* (2013.01); *G05B 13/027* (2013.01)

(58) Field of Classification Search
CPC ............ C25D 7/12–123; C25D 17/001; H01L 21/2885; H01L 21/76873; H01L 2224/11462; G06T 2207/30148; G05B 13/027
See application file for complete search history.

(56) References Cited

U.S. PATENT DOCUMENTS

| | | | | |
|---|---|---|---|---|
| 2004/0084315 A1* | 5/2004 | Mizohata | ............ | H01L 21/2885 205/291 |
| 2004/0089555 A1* | 5/2004 | Sendai | .............. | H01L 21/67742 205/137 |
| 2004/0245111 A1* | 12/2004 | Fujimoto | ............... | H05K 3/241 204/198 |
| 2006/0078709 A1* | 4/2006 | Lue | ...................... | C25D 17/001 427/532 |

(Continued)

FOREIGN PATENT DOCUMENTS

| | | |
|---|---|---|
| CN | 210325701 U | 4/2020 |
| JP | 2004146489 A | 5/2004 |

(Continued)

OTHER PUBLICATIONS

Application No. PCT/US2022/046591, International Search Report and Written Opinion, Mailed On Feb. 14, 2023, 10 pages.

*Primary Examiner* — Hosung Chung
(74) *Attorney, Agent, or Firm* — Kilpatrick Townsend & Stockton LLP

(57) ABSTRACT

A semiconductor processing chamber may process wafers by submerging the wafers in a liquid. To determine when the liquid is free of disturbances or contaminants and thus ready to receive the next wafer, a camera may be positioned to capture images of the liquid after a wafer has been removed from the liquid. A controller may provide the images of the liquid to a neural network to determine when the liquid is ready based on an output of the neural network. The neural network may be trained to identify disturbances, such as ripples, bubbles, or contaminants in the liquid. The controller may then begin controlling the next semiconductor process and submerge the next wafer.

16 Claims, 9 Drawing Sheets

(56) References Cited

U.S. PATENT DOCUMENTS

| | | | |
|---|---|---|---|
| 2007/0068818 A1* | 3/2007 | Guo | C25D 21/12 |
| | | | 205/82 |
| 2008/0149489 A1* | 6/2008 | Varadarajan | C25D 17/06 |
| | | | 205/137 |
| 2009/0095634 A1* | 4/2009 | Makino | H01L 21/2885 |
| | | | 205/223 |
| 2012/0133913 A1 | 5/2012 | Okita | |
| 2014/0001050 A1* | 1/2014 | Huang | C25D 17/001 |
| | | | 204/229.4 |
| 2014/0347465 A1* | 11/2014 | Takahashi | G06T 7/0004 |
| | | | 348/87 |
| 2016/0010236 A1* | 1/2016 | Rubin | C25D 21/14 |
| | | | 204/267 |
| 2016/0281251 A1* | 9/2016 | Paneccasio | H01L 21/2885 |
| 2017/0194126 A1* | 7/2017 | Bhaskar | G06T 7/0004 |
| 2018/0075594 A1* | 3/2018 | Brauer | G06V 10/454 |
| 2018/0082862 A1 | 3/2018 | Ashidate et al. | |
| 2019/0073568 A1* | 3/2019 | He | G06F 18/40 |
| 2020/0135511 A1* | 4/2020 | Lee | G01N 21/8422 |
| 2020/0371046 A1* | 11/2020 | Wang | G01N 21/9505 |
| 2021/0014979 A1* | 1/2021 | Adler | G06F 30/398 |
| 2021/0209418 A1* | 7/2021 | Badanes | G06F 18/2155 |
| 2022/0405902 A1* | 12/2022 | Estrella | G06T 7/001 |
| 2023/0072040 A1* | 3/2023 | Kakishita | G06N 3/08 |
| 2023/0118322 A1* | 4/2023 | Yoon | D06F 33/36 |
| | | | 68/12.02 |

FOREIGN PATENT DOCUMENTS

| | | | |
|---|---|---|---|
| JP | 2021190515 A | 12/2021 | |
| WO | WO-2021157330 A1 * | 8/2021 | G06N 20/00 |

* cited by examiner

WAFER IMMERSION IN SEMICONDUCTOR PROCESSING CHAMBERS

TECHNICAL FIELD

This disclosure generally relates to wafer immersion in a semiconductor processing chamber. More specifically, this disclosure describes using and training a model to classify liquid images to control the timing of wafer immersion to reduce process irregularities.

BACKGROUND

Electroplating uses electrodeposition to coat an object in a layer of metal. Generally, an anode and a cathode are placed in an electrolyte chemical bath and exposed to an electrical current. Electricity causes negatively charged anions to move to the anode and positively charged cations to be transferred to the cathode. This process covers or plates the desired part of the cathode with an even metal coating from the anode material. While electroplating has applications in many different industries, this technique is extensively used in semiconductor manufacturing processes to unifor are found annexing review mly deposit a layer of metal on a semiconductor wafer. Electrochemical deposition chambers may submerge the semiconductor wafer in a chemical bath of an electrolyte liquid. Anodes may be distributed throughout the chemical bath to provide electrical current through the electrolyte to the wafer, which acts as the cathode in the reaction. The thickness of the metal film can be tightly controlled based on the current levels and run-time of the process.

SUMMARY

In some embodiments, a semiconductor processing system may include a semiconductor processing chamber that is configured to execute a process on a semiconductor wafer that is at least partially submerged in a liquid within the semiconductor processing chamber. The semiconductor processing system may also include a camera that is positioned to capture images of the liquid. The semiconductor processing system may further include a controller configured to provide the images of the liquid using a neural network; determine when the liquid is ready to receive the semiconductor wafer based on an output of the neural network; and in response to determining that the liquid is ready to receive the semiconductor wafer, cause the semiconductor wafer to be at least partially submerged in the liquid.

In some embodiments, a method of operating a semiconductor processing system may include capturing images of a liquid within a semiconductor processing chamber of the semiconductor processing system; providing the images of the liquid to a neural network; determining when the liquid is ready to receive a semiconductor wafer based on an output of the neural network; and controlling a process involving the liquid in the semiconductor processing chamber based on a determination as to whether the liquid is ready to receive the semiconductor wafer.

In some embodiments, a non-transitory computer-readable medium may include instructions that, when executed by one or more processors, cause the one or more processors to perform operations including receiving images of a liquid within a semiconductor processing chamber of the semiconductor processing system; providing the images of the liquid to a neural network; determining when the liquid is ready to receive a semiconductor wafer based on an output of the neural network; and controlling a process involving the liquid in the semiconductor processing chamber based on a determination as to whether the liquid is ready to receive the semiconductor wafer.

In any embodiments, any and all of the following features may be implemented in any combination and without limitation. The semiconductor processing chamber may include a window in a housing of the semiconductor processing chamber; and the camera may be positioned outside of the semiconductor processing chamber such that the camera captures the images of the liquid through the window in the housing of the semiconductor processing chamber. The camera may be positioned above a fill level of the liquid. The camera may be positioned to capture the images of a surface of the liquid. The semiconductor processing chamber may include an electrochemical deposition chamber, the liquid may include an electrolyte, and the process may include an electroplating process on the semiconductor wafer. Causing the semiconductor wafer to be at least partially submerged in the liquid may include inserting the semiconductor wafer into the liquid at an angle; and determining when to cause the semiconductor wafer to be rotated to a flat position to be submerged in the liquid. The semiconductor processing chamber may be further configured to remove a previous semiconductor wafer from the liquid; the camera may be configured to capture the images of the liquid after the previous semiconductor wafer is removed from the liquid; and the semiconductor processing chamber may be further configured to submerge the semiconductor wafer into the liquid in response to the controller determining that the liquid is ready to receive the semiconductor wafer. The camera may be positioned to capture an overhead view of the liquid from a top of the semiconductor processing chamber. Determining when the liquid is ready to receive the semiconductor wafer may include determining that more than a predetermined threshold amount of a surface of the liquid is free of bubbles, determining that a surface of the liquid is free of ripples, determining that less than a threshold amount of contaminants are visible in the liquid, and/or determining that the liquid is above a predetermined threshold level in the semiconductor processing chamber. Controlling the process involving the liquid in the semiconductor processing chamber may include causing the liquid to be changed from the semiconductor processing chamber. The neural network may include a convolutional neural network with one or more convolution filters that identify images of disturbances on a surface of the liquid. The method/operations may also include receiving a sequence of previous images of the liquid captured after a previous semiconductor wafer was removed from the liquid; and training the neural network using the sequence of previous images. The method/operations may also include receiving an input identifying an image in the sequence of previous images as indicating that the liquid is ready to receive a semiconductor wafer; labeling previous images before the image in the sequence of previous images as indicating that the liquid is not ready to receive the semiconductor wafer; labeling previous images after the image in the sequence of previous images as indicating that the liquid is ready to receive semiconductor wafer; and using the previous images with corresponding labels as training data for the neural network. The images of the liquid may be captured at regular intervals of between approximately 1 second and approximately 10 seconds. The method/operations may further include using the images of the liquid to later train the neural network.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

In order for an electrochemical deposition process to generate a uniform film on a semiconductor wafer without voids or other irregularities, the electrolyte liquid should evenly coat the surface of the wafer as the wafer is inserted into the chemical bath. However, when a previous wafer is removed from the liquid, this removal can form defects in the surface of the liquid that take time to dissipate. For example, removing a previous wafer may cause bubbles or foam to form on the surface meniscus of the liquid, contaminants to be left behind in the liquid, and/or ripples to propagate across the surface of the liquid. Before the next wafer can be submerged in the liquid, a time delay is used between wafer processes to allow the surface of the liquid to recover.

The embodiments described herein optimize this time delay between wafer processes by analyzing real-time images of the liquid surface using a trained neural network. A camera may be positioned to sequentially capture a live stream of images from the surface of the liquid after a wafer is removed. A neural network may be trained to identify the likelihood that different defects are present in the surface of the liquid (e.g., foam, bubbles, contaminants, ripples, etc.). These images can be processed in real time as they are received by the controller, and the output of the neural network may indicate when the liquid is ready to receive the next semiconductor wafer. This timing may be used to control the semiconductor process such that the wait time between wafers is minimized, electrolyte liquids are properly maintained and rotated, and wafer failures are reduced.

Figure 1:
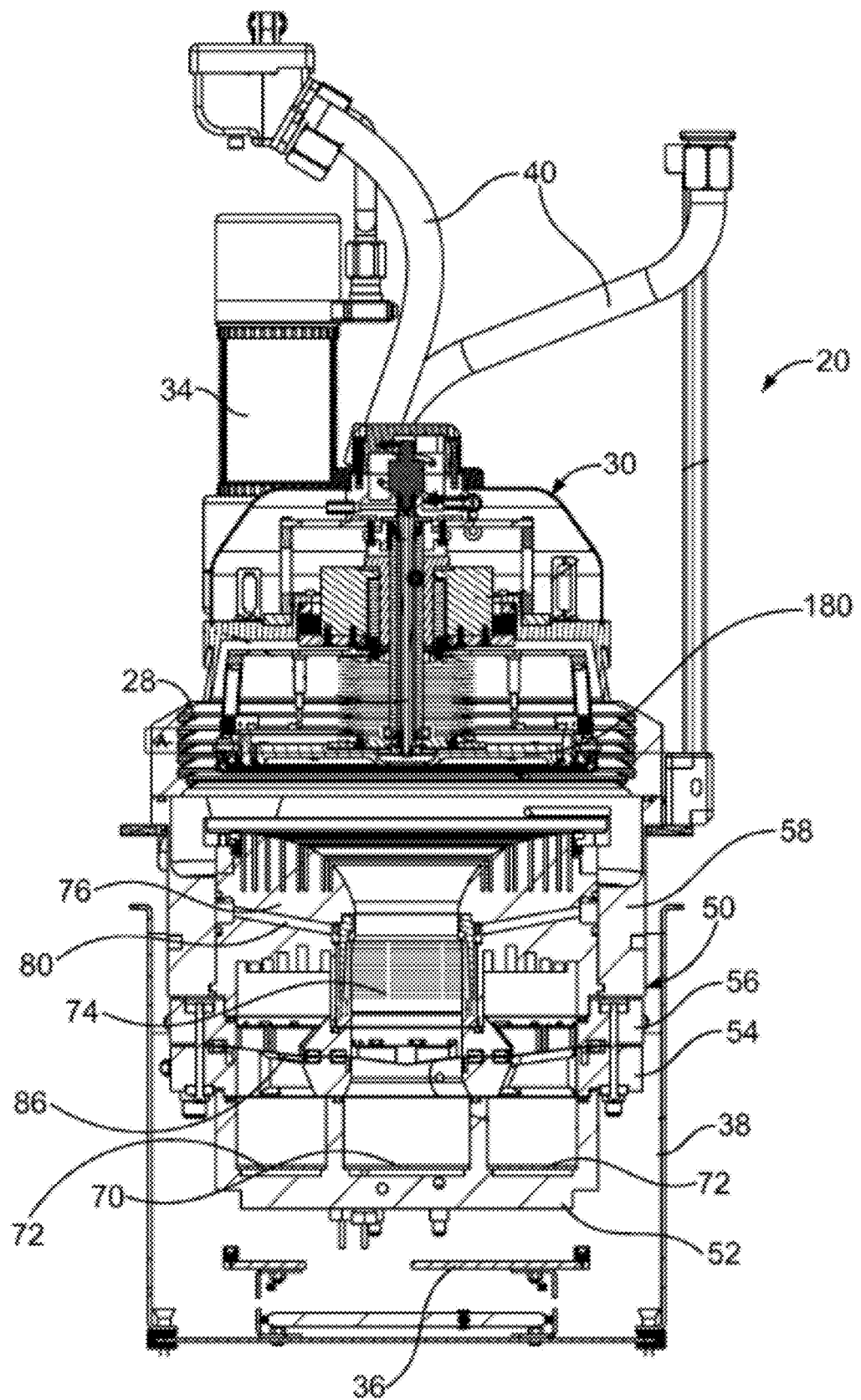
FIGS. 1-2 illustrate an electrochemical processor, according to some embodiments.
Figure 2:
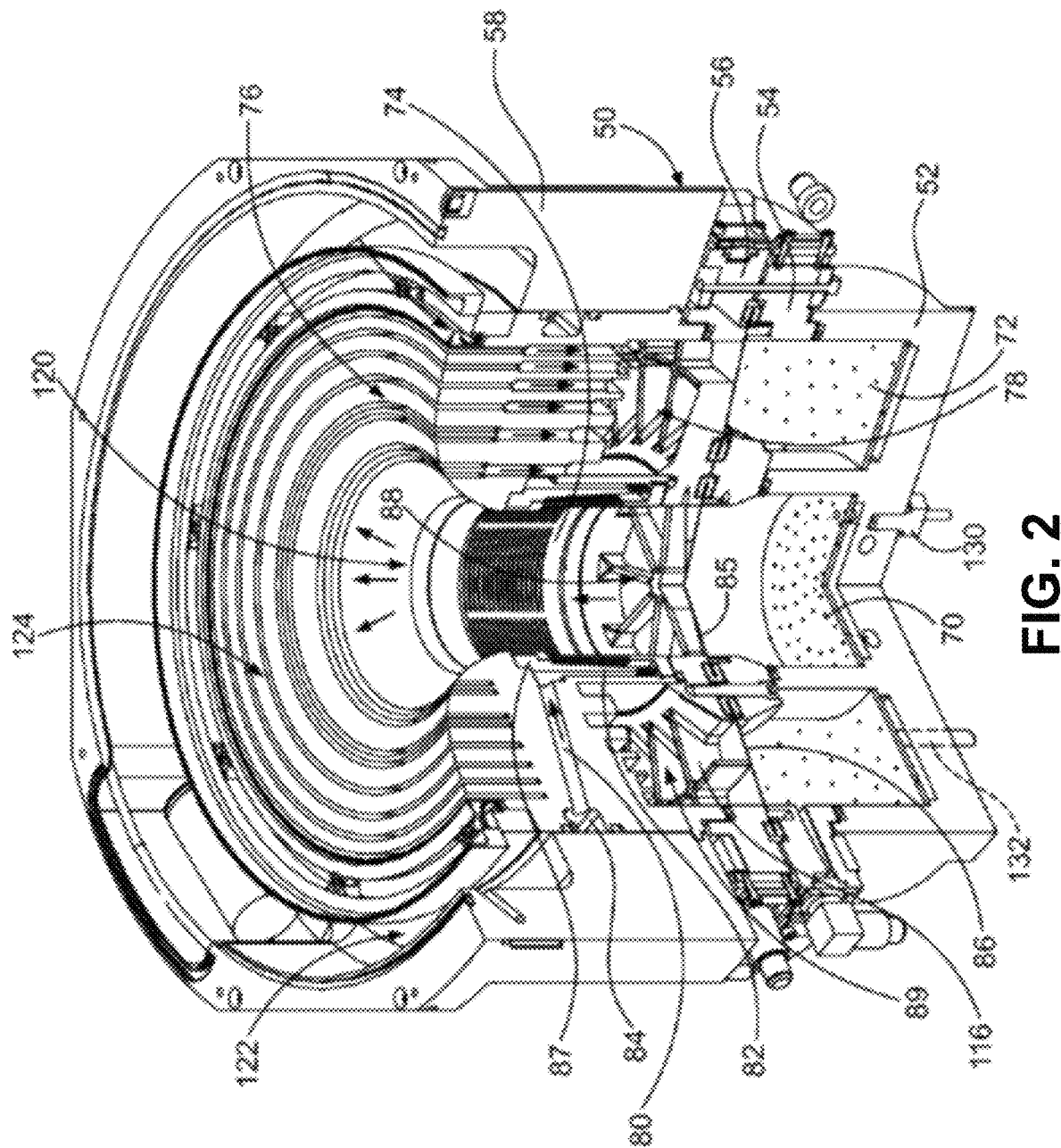

FIGS. 1-2 illustrate an electrochemical processor 20, according to some embodiments. The electrochemical processor 20 may include a head positioned above a vessel assembly 50. The vessel assembly 50 may be supported on deck plate 24 and a relief plate 26 attached to a stand 38 or other structure. A single processor 20 may be used as a standalone unit. Alternatively, multiple processors 20 may be provided in arrays with workpieces loaded and unloaded in and out of the processors by one or more robots. A head 30 may be supported on a lift/rotate unit 34, for lifting and inverting the head to load and unload a workpiece into the head, and for lowering the head 30 into engagement with the vessel assembly 50 for processing.

Electrical control and power cables 40 may be linked to the lift/rotate unit 34 and to internal head components and may lead up from the processor 20 to facility connections, or to connections within multi-processor automated system. A rinse assembly 28 having tiered drain rings may be provided above the vessel assembly 50. A drain pipe 42 may connect the rinse assembly 28, if used, to a facility drain. An optional lifter 36 may be provided underneath the vessel assembly 50 to support the anode cup during changeover of the anodes. Alternatively, the lifter 36 may be used to hold the anode cup up against the rest of the vessel assembly 50.

The vessel assembly 50 may include an anode cup 52, a lower membrane support 54, and upper membrane support 56 held together with fasteners 60. Within the anode cup 52, a first or inner anode 70 may be positioned near the bottom of an inner anolyte chamber 110. A second or outer anode 72 may be positioned near the bottom of an outer anolyte chamber 112 surrounding the inner anolyte chamber 110. The inner anode 70 may be a flat round metal plate, and the outer anode 72 may be flat ring-shaped metal plate, for example, a platinum plated titanium plate. The inner and outer anolyte chambers may be filled with copper pellets. The inner anode 70 may be electrically connected to a first electrical lead or connector 130, and the outer anode 72 may be electrically connected to a separate second electrical lead or connector 132. In some embodiments, for example for processing 300 mm diameter wafers, the processor may have a center anode, and a single outer anode. Designs having three or more anodes may also optionally be used, especially with even larger wafers.

An upper cup 76 may be contained within or surrounded by an upper cup housing 58. The upper cup housing 58 may be attached to and sealed against the upper cup 76. The upper cup 76 may have a curved upper surface 124 and a central through opening that forms a central or inner catholyte chamber 120. This chamber 120 is defined by the generally cylindrical space within a diffuser 74 leading into the bell or horn shaped space defined by the curved upper surface 124 of the upper cup 76. A series of concentric annular slots extend downwardly from the curved upper surface 124 of the upper cup 76. An outer catholyte chamber 78 formed in the bottom of the upper cup 76 is connected to the rings via an array of tubes or other passageways.

Similarly, a second or outer membrane 86 may be secured between the upper and lower membrane supports and may separate the outer anolyte chamber 112 from the outer catholyte chamber 78. An outer membrane support 89, which may be provided in the form of radial legs 116 on the upper membrane support 56, supports the outer membrane from above.

A diffuser circumferential horizontal supply duct 84 may be formed in an outer cylindrical wall of the upper cup 76, with the duct 84 sealed by O-rings or similar elements between the outer wall of the upper cup 76 and the inner cylindrical wall of the upper cup housing 58. Radial supply ducts 80 may extend radially inwardly from the circumferential duct 84 to an annular shroud plenum 87 surrounding the upper end of the diffuser shroud 82. The radial ducts 80 pass through the upper cup 76 in between the vertical tubes connecting the annular slots in the curved upper surface 124 of the upper cup 76 to the outer catholyte chamber 78. The circumferential duct 84 and the radial ducts 80 lead to the shroud plenum 87, and the outer catholyte paths may be formed between the diffuser shroud 82 and the diffuser 74. These outer catholyte paths may ordinarily be filled with liquid catholyte during operation of the processor 20.

In use, a workpiece, typically having an electrically conductive seed layer, is loaded into the head. The seed layer on the workpiece is connected to an electrical supply source, typically to the cathode. If the head is loaded in a face up position, the head is flipped over so that the rotor, and the workpiece held in the rotor, are facing down. The head is then lowered onto the vessel until the workpiece is in contact with the catholyte in the vessel. The spacing between the work piece and the curved upper surface of the upper cup influences the current density uniformity at the workpiece Surface. This gap may be changed during processing. The workpiece may be moved up and away from the surface gradually, or it may be moved quickly from a starting gap to an ending gap. A lift/rotate mechanism may be used to lift the head.

Anolyte is provided into the inner anolyte chamber and separately into the outer anolyte chamber. Catholyte is provided into the circumferential supply duct. Catholyte is supplied to the inlet fitting. The workpiece is moved into contact with the catholyte, typically by lowering the head. Electrical current to the anodes 70 and 72 is switched on with current flowing from the anodes through the anolyte in the inner and outer anolyte chambers. The electrical current from the inner and outer anodes passes through the anolyte and through the inner and outer membranes and into the catholyte contained in the open spaces in the upper cup 76.

Within the upper cup 76, catholyte flows from the supply duct 84 radially inwardly to the diffuser shroud plenum 87 and then into the diffuser 74. The catholyte flows up from the diffuser and moves radially outwardly in all directions over the curved upper surface 124 of the upper cup 76. Metal ions in the catholyte deposit onto the workpiece, building up a metal layer on the workpiece. The motor may be switched on to rotate the rotor and the workpiece, to provide more uniform deposition onto the workpiece. Most of the catholyte then flows into the collection ring 122. A small fraction of the catholyte flows downwardly through the slots and the tubes into the outer catholyte chamber 78. The catholyte then flows out of the processor 20.

The semiconductor processing chamber illustrated above in FIGS. 1-2 may be configured to execute a process on a semiconductor wafer that is at least partially submerged in a liquid within the semiconductor chamber. For example, an electroplating process may be performed on the semiconductor wafer by submerging the wafer and electrolyte and allowing the wafer to act as a cathode with a corresponding anode. When electrical current is allowed to flow through the anode and cathode, the electroplating process may produce a metal coating on the wafer through the reduction of cations of the metal on the anode.

Figure 3:
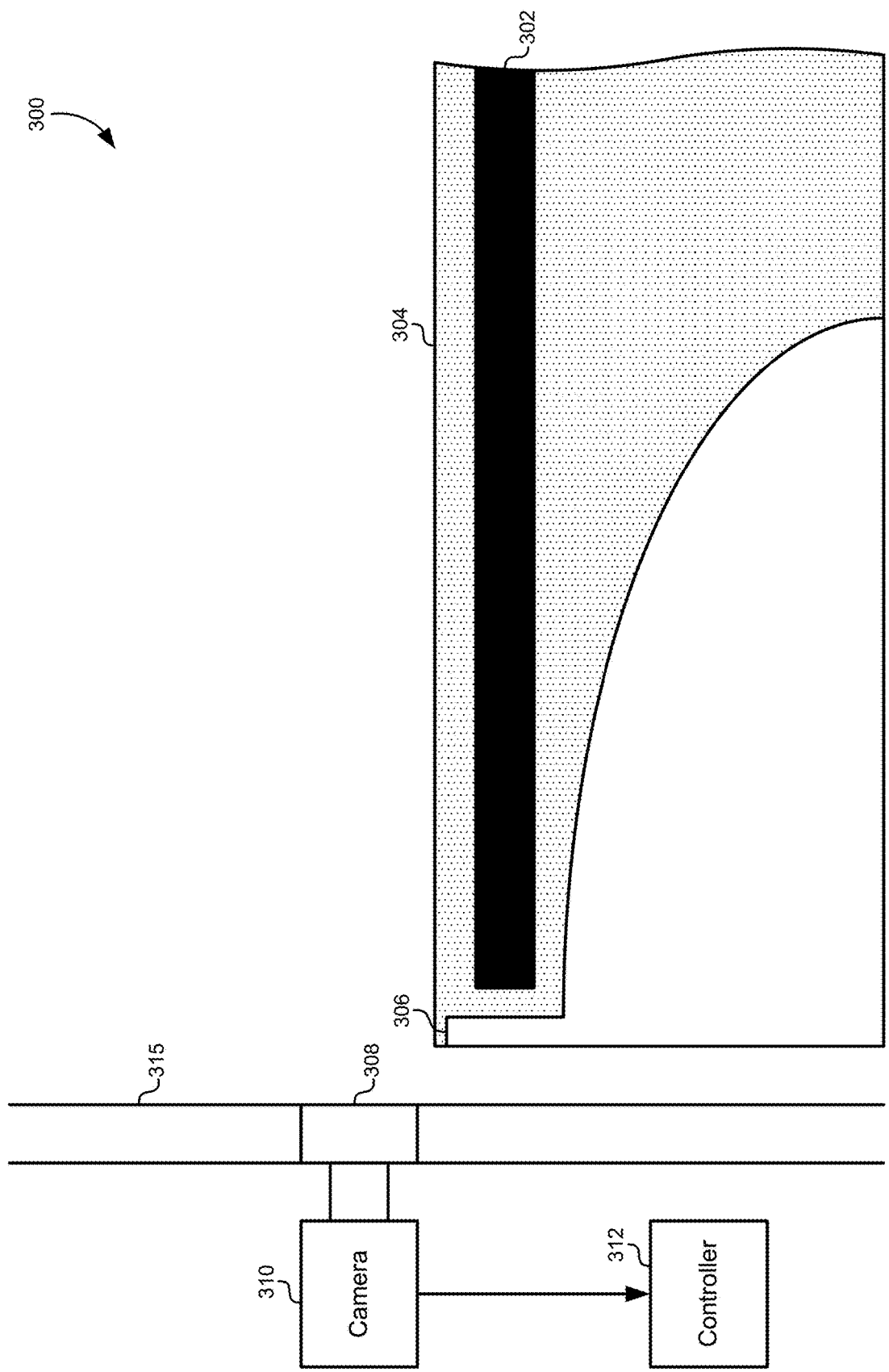
FIG. 3 illustrates a simplified diagram of a semiconductor processing chamber, according to some embodiments.

FIG. 3 illustrates a simplified diagram of a semiconductor processing chamber 300, according to some embodiments. The semiconductor processing chamber 300 may be part of a semiconductor processing system, which may include any of the components described above in FIGS. 1-2. The semiconductor processing chamber 300 may be configured to submerge a semiconductor wafer 302 in a liquid 304. The liquid 304 may include an electrolyte (or catholyte) and may facilitate a process such as the electroplating process described above. Although not shown explicitly in FIG. 3, the semiconductor processing chamber 300 may also include a chuck or other mechanism for gripping and supporting the semiconductor wafer 302 as the semiconductor wafer is lowered into the liquid 304, lifted up out of the liquid 304, rinsed, and moved to a subsequent processing chamber in a semiconductor manufacturing process.

The semiconductor wafer 302 may include a silicon substrate with integrated circuits or other electronic components fabricated using patterned layers on the semiconductor wafer 302. Therefore, the process performed by the semiconductor processing chamber 300 may be one of many processes performed on the semiconductor wafer 302, including deposition processes, etch processes, polishing processes, and/or other semiconductor manufacturing processes. The semiconductor processing chamber may be configured to sequentially process a plurality of wafers, one after the other, performing an electroplating process on each wafer as they are moved into the semiconductor processing chamber. For example, as the semiconductor wafer 302 finishes the electroplating process, the chuck may lift the semiconductor wafer 302 out of the liquid 304, rinse the semiconductor wafer 302, and move the semiconductor wafer 302 into another processing chamber, such as a polishing chamber. Then, when the liquid 304 is ready, the next semiconductor wafer may be transferred from a previous processing chamber, such as an etch chamber, lowered into the liquid 304 for processing.

A technical problem currently exists when cycling semiconductor wafers through the semiconductor processing chamber 300. Specifically, when a previous semiconductor wafer finishes the electroplating process, the wafer is lifted out of the liquid 304 as described above. When the semiconductor wafer is lifted out of the liquid 304, this process disturbs the surface of the liquid 304. For example, removing a semiconductor wafer may cause bubbles, foam, ripples, waves, or other surface disturbances on the meniscus of the liquid 304. Furthermore, contaminants may begin to collect in the liquid 304 over time when processing numerous semiconductor wafers. If a subsequent semiconductor wafer was to be immediately lowered into the liquid 304 before the surface of the liquid 304 was relatively smooth, bubbles may become trapped against the surface of the wafer and/or waves and ripples in the liquid 304 may cause the wafer 302 to be unevenly coated by the liquid 304. Any nonuniformity in the coating of the liquid 304 over the wafer 302 may cause a corresponding nonuniformity in the subsequent electroplating process, thereby causing a film deposited on the semiconductor wafer to be nonuniform. This may ultimately lead to variations in performance of the integrated circuits on the semiconductor wafer, and may even cause individual dies or the wafer as a whole to be ruined.

Additionally, the liquid 304 may be continuously cycled through the semiconductor processing chamber. A weir 306 around the edge of a container for the liquid 304 may allow the liquid 304 to spill over the edge of the weir 306 when the container is full. Thus, when the wafer 302 into is submerged in the liquid 304, the liquid 304 may drain out of the container over the weir 306 to maintain a relatively consistent liquid level. However, when the wafer 302 is removed from the liquid 304, the level of the liquid 304 may fall below the level of the weir 306 for a time interval. As the liquid 304 continues to flow into the container of the semiconductor processing chamber 300, the level of the liquid 304 may slowly rise until it again reaches the level of the weir 306.

Typically, in order to ensure that the liquid 304 is ready to receive the next semiconductor wafer, a controller 312 for the semiconductor processing system may use a delay between each wafer to give the liquid 304 time to stabilize. For example, by waiting 60 seconds between each wafer, the ripples or waves on the surface of the liquid 304 may stabilize, any bubbles or foam on the surface of the liquid 304 may dissipate, the surface level of the liquid 304 may rise to the proper level, and any contaminants on the meniscus of the liquid 304 may flow out of the semiconductor processing chamber 300. This long wait time ensures that the condition of the liquid 304 does not adversely affect the process executed on a subsequent semiconductor wafer.

On the other hand, while this uniform, long wait time ensures that the liquid 304 stabilizes, it also adds a bottleneck to a manufacturing process as wafers are transferred from one processing chamber to the next. A long, uniform delay between each wafer may waste time when the liquid 304 recovers quickly, and may also be not enough time when the liquid 304 is greatly disturbed. Prior to this disclosure there was no reliable method for automatically determining when the state of the liquid 304 was ready to receive a subsequent semiconductor wafer.

The embodiments described herein solve these and other problems by sequentially capturing images of the surface of the liquid 304 between each semiconductor wafer. These images may be processed by the controller 312 using a neural network that is trained to identify defects in the surface of the liquid 304 and provide an output that can indicate when the surface of the liquid 304 is substantially free of defects (e.g., bubbles, ripples, waves, contaminants, being below the proper fill level, etc.). As soon the liquid 304 has sufficiently recovered from the removal of the previous semiconductor wafer, the controller 312 can trigger the process for a subsequent semiconductor wafer to begin. Thus, the time interval between semiconductor wafers can be optimized for each wafer, such that the delay is only as long as may be required for the liquid 304 to recover properly.

FIG. 3 illustrates how the semiconductor processing system may include a camera 310. The camera may be implemented using any type of camera, including a charge-coupled device (CCD) camera. Some embodiments may also use a video camera to capture individual image frames. The camera 310 may be located outside of a housing 315 of the semiconductor processing chamber 300. For example, the housing 315 may include a window 308, and the camera 310 may be positioned outside of the semiconductor processing chamber 300. Alternatively, the camera 310 may be located inside the housing 315 of the semiconductor processing chamber 300.

Whether inside or outside of the semiconductor processing chamber 300, the camera 310 may be positioned to capture images of the liquid 304. Specifically, some embodiments may position the camera to capture images of a surface or meniscus of the liquid 304. For example, the camera 310 may be oriented such that the line of sight of the camera 310 is parallel with an ideal surface of the liquid 304. Other embodiments may slightly tilt the orientation of the camera 310 such that it is angled down towards the surface of the liquid 304 to a small degree (e.g., less than approximately 10°. The camera 310 may be positioned just above a fill level of the liquid 304 (e.g., less than approximately 10 cm). These arrangements allow the camera 310 to capture images that reveal defects, bubbles, ripples, waves, or other disturbances along the surface of the liquid 304. These arrangements also allow the camera 310 to identify a level of the liquid 304 relative to the weir 306 or other elevation markers in the semiconductor processing chamber 300.

The location of the camera 310 is not limited to the configuration illustrated in FIG. 3. Some embodiments may place the camera 310 directly above the liquid 304 such that the camera 310 is positioned to capture overhead views of the liquid 304. As described below, the images captured by the camera 310 may be processed using a neural network that is specifically trained to recognize surface defects in the liquid 304. Thus, when using a camera that is positioned above the liquid 304 and oriented to capture overhead images, these overhead images may be used to train the neural network. Alternatively, when the cameras positioned as illustrated in FIG. 3, these side-view images may be used to train the neural network.

The camera 310 may be communicatively coupled to the controller 312 through a wired or wireless connection. The controller 312 may be implemented using any computing device, such as the computing device described in detail below. For example, the controller 312 may include one or more processors and one or more memory devices storing instructions thereon. The instructions may cause the one or more processors to perform operations such as causing the camera 310 to start/stop capturing images of the surface of the liquid 304, receiving a sequence of images in real time, processing images using a neural network, interpreting an output of the neural network to determine whether the liquid is ready to receive the next semiconductor wafer, and/or controlling various aspects of the semiconductor process, such as causing the next semiconductor wafer to be lowered and/or submerged in the liquid 304. The controller 312 may be configured or programmed to perform any of the operations or method steps described herein.

Figure 4:
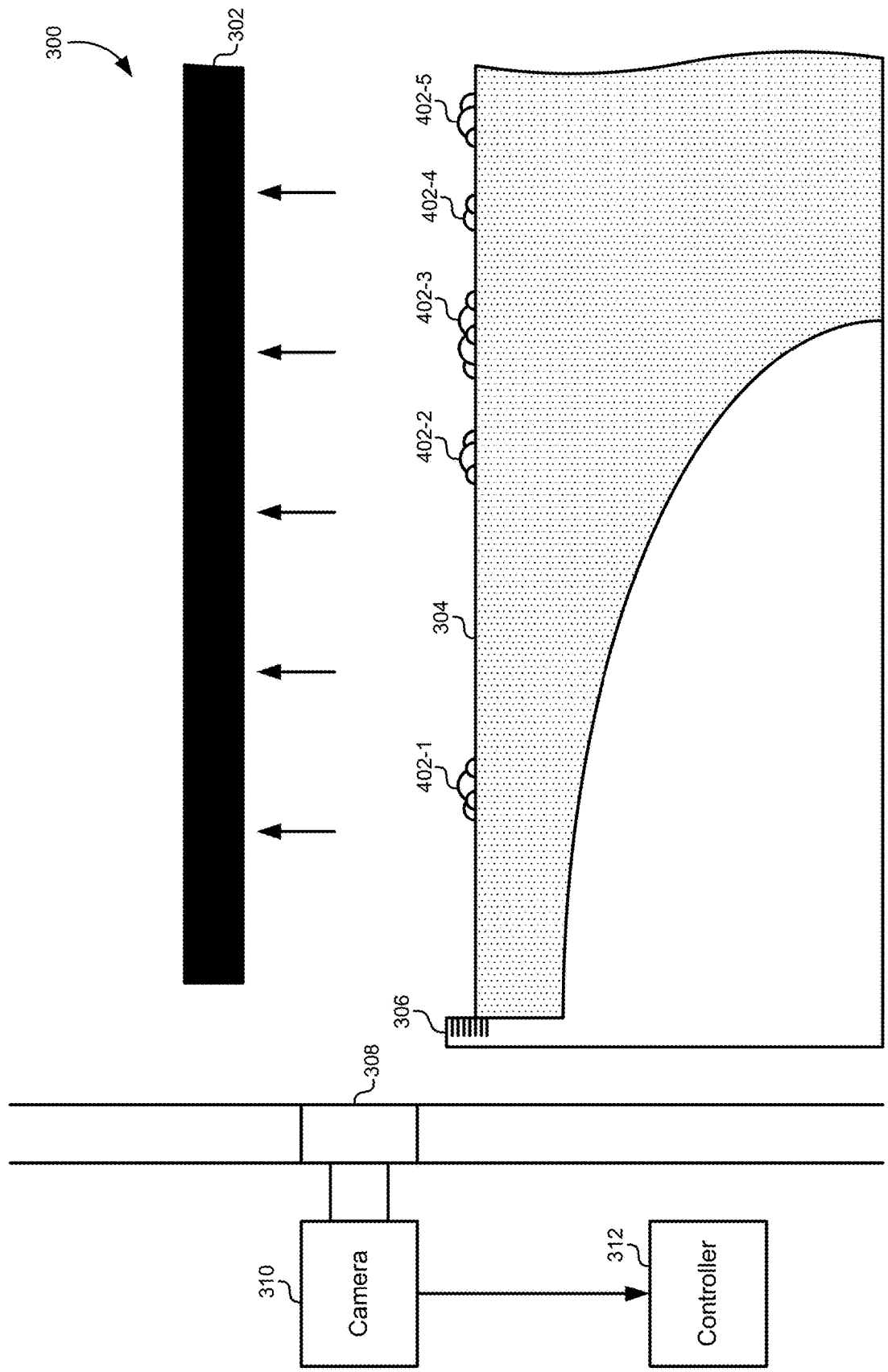
FIG. 4 illustrates how the camera may be used to capture images that evaluate the surface of the liquid, according to some embodiments.

FIG. 4 illustrates how the camera 310 may be used to capture images that evaluate the surface of the liquid 304, according to some embodiments. Raising the wafer 302 out of the liquid 304 may cause surface disturbances in the liquid 304. For example, this may cause bubbles 402 and/or foam to be generated on the surface of the liquid 304 as described above. Additionally, as depicted in FIG. 4, raising the wafer 302 out of the liquid 304 may cause the level of the liquid 304 to drop below the level of the weir 306. If a new wafer were submerged in the liquid 304 at this stage, the lower level of the liquid 304 may not be sufficient to uniformly coat the wafer as it is submerged. The bubbles 402 and/or foam up may also be trapped under the new wafer, causing voids in the coating applied by the electroplating process.

The camera 310 may capture images of the liquid 304. For example, as the bubbles 402 and/or foam protrude above the surface of the liquid 304, the angle of the camera 310 may capture these bubbles 402 and/or foam in images. Additionally, the bubbles 402 and/or foam may have a different color or texture from the smooth surface of the liquid 304. For example, the bubbles 402 may be more reflective, colored lighter, and/or may have additional visual differences such that they can be identified against the surface of the liquid 304 by the neural network.

The camera 310 may also be used to measure the level of the liquid 304. Although not shown explicitly in FIG. 4, an opposite side of the container holding the liquid 304 may be visible to the camera 310. The weir 306 visible in the cross-section of FIG. 4 may also be visible on the opposite side of the container to the camera 310. In some embodiments, the inside surface of the weir 306 may include level markers that indicate a level of the liquid 304 relative to the height of the weir 306. The images captured by the camera 310 may then show the level of the liquid 304 relative to these level markers on the inside surface of the weir 306. The neural network may be trained to identify each of the visible level markers on the weir 306 to generate an output indicating the height of the level of the liquid 304. The neural network may also identify when the weir 306 is no longer visible, thereby indicating that the level of the liquid 304 is at its maximum or ideal height for submerging the next semiconductor wafer.

In some embodiments, the camera 310 may continuously capture images of the liquid 304, both between and during processes performed on wafers. In some embodiments, the controller 312 may cause the camera 310 to begin capturing images of the liquid 304 after the wafer 302 is removed from the liquid 304. In some embodiments, the controller 312 may cause the camera 310 to begin capturing images upon the expiration of a time delay after the wafer 302 is removed from the liquid 304. For example, even under the best of conditions, it may be determined that the liquid 304 will not be ready for at least 10 seconds after removing the wafer 302. The controller 312 may wait for this 10 second interval before causing the camera 310 to begin capturing images.

The controller 312 may cause the camera 310 to capture a sequence of images in real time at regular time intervals between wafer processes. For example, some embodiments may cause the camera 310 to capture an image at a regular interval ranging from between approximately 1 second and approximately 10 seconds. In some embodiments, the interval at which the camera 310 captures images may increase. For example, the camera 310 may capture an image every 5 seconds for the first 30 seconds between wafer processes, then increase the interval to capture images every 1 second thereafter. This allows the controller 312 to capture images at a slower rate when it is less likely that the liquid 304 will be ready, and increased to a faster rate as it becomes more likely that the liquid 304 will be ready.

Figure 5:
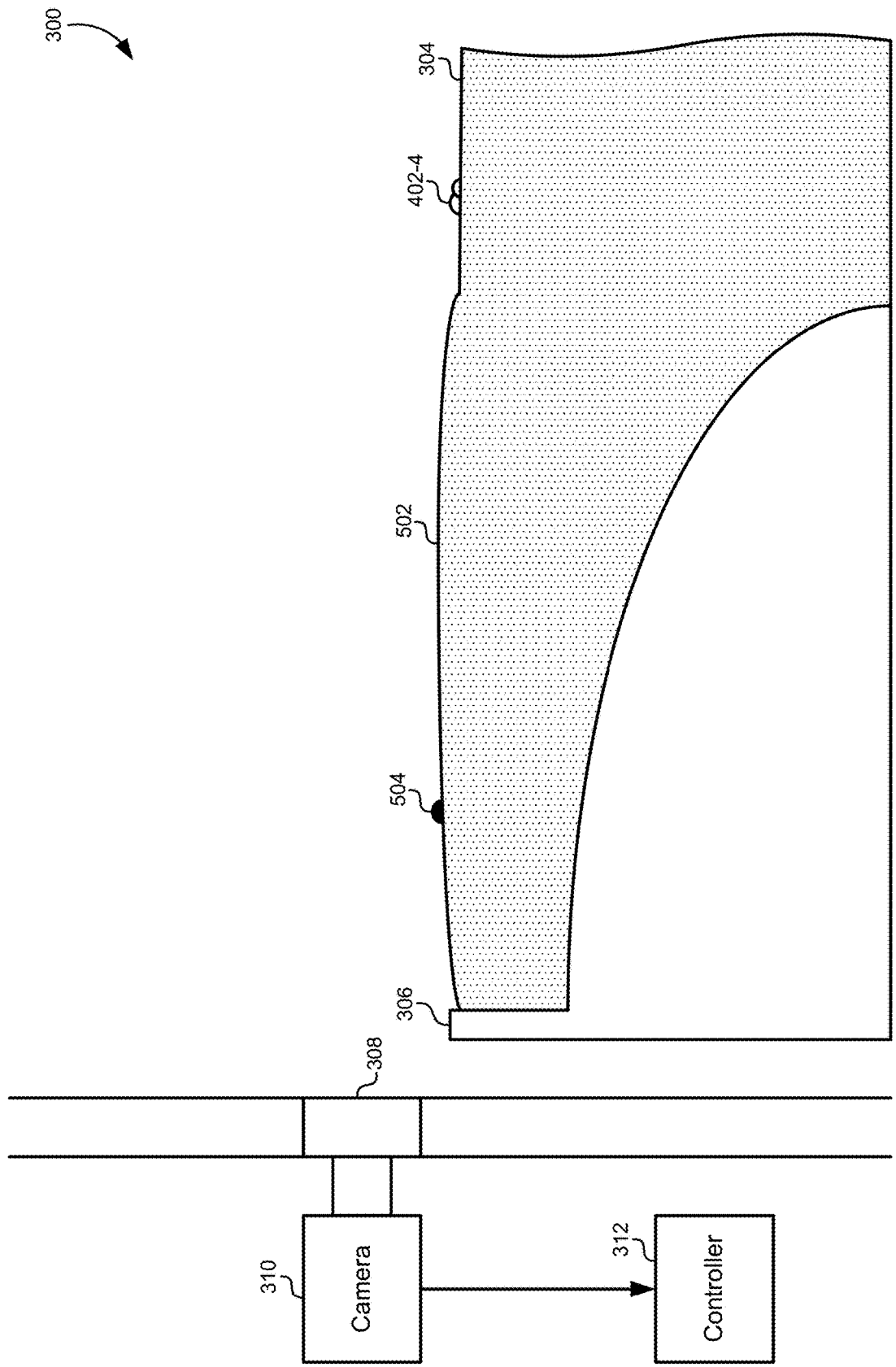
FIG. 5 illustrates how the camera may be used to capture images that evaluate the surface of the liquid for ripples, waves or contaminants, according to some embodiments.

FIG. 5 illustrates how the camera 310 may be used to capture images that evaluate the surface of the liquid 304 for ripples, waves, or contaminants, according to some embodiments. As the wafer 302 is removed from the liquid 304, this action may cause ripples or waves to propagate or oscillate across the surface of the liquid 304. As illustrated in FIG. 5, a ripple 502 may cause areas of the surface of the liquid 304 to be higher than other areas of the surface of the liquid 304. The angle of the camera 310 may capture these differences in the height of the liquid 304 in the images that are captured and processed by the controller 312. Note that a ripple 502 or wave may be combined with bubbles 402 or foam as described above.

In some cases, a contaminant, such as dust, particles, crystal fragments, and/or other solid materials may be present in the liquid 304. For example, a contaminant 504 may float at or near the surface of the liquid 304. In some cases, the camera 310 may capture an image of the contaminant 504 as it protrudes above the surface of the liquid 304. Alternatively, if the contaminant 504 is below the surface of the liquid 304, the camera 310 may still capture an image of the contaminant 504 if the color or texture of the contaminant 504 is different from the color of the liquid 304 and visible beneath the surface of the liquid 304.

As the camera 310 captures images of the liquid 304, these images may be transmitted in real-time to the controller 312. The controller 312 may receive the images of the liquid within the semiconductor processing chamber and provide the images of the liquid to a neural network. A neural network may include an artificial network of functions or parameters that can be tuned and optimized through a training process to recognize features of an image. Some embodiments may use a convolutional neural network where the internal layers implement convolutional filters, each of which may be configured to recognize different types of defects in the surface of the liquid. These convolutional layers may pass filters over the pixels of the image to identify whether any of the corresponding defects are present. The training process may use images with defects visible in the images of the liquid. By correctly labeling these images, they may be presented as training data to the neural network to optimize the parameter values of each layer. After the training process, the neural network may be configured to output signals that indicate the presence of any type of previously identified defect in the liquid.

When the neural network is properly trained, the controller 312 may sequentially receive images at the intervals described above from the camera 310. As each image is received, the controller 312 may provide the image as an input to the neural network. The neural network may process the image by propagating the pixel values through the internal layers representing the convolution filters. The neural network may then generate outputs that correspond to a likelihood that a particular type of defect is present in the liquid 304. For example, the neural network may include separate outputs for bubbles, foam, contaminants, waves, ripples, and other surface imperfections. These outputs may be a decimal value between 0.0 and 1.0, with 1.0 representing a 100% probability that the corresponding defect is present in the image. Each of these outputs may be compared to individual threshold values for that particular defect type (e.g., 0.15). If any of the outputs are above the corresponding threshold value, the controller 312 may determine that the liquid is not yet ready to receive the next semiconductor wafer.

In another example, an output from the neural network may indicate a level of the liquid 304 in the container. Lower values near 0.0 may indicate that the liquid 304 is at its lowest level, and higher values near 1.0 may indicate that the liquid 304 is near its maximum or ideal value. This output may be compared to a threshold to determine when the liquid 304 is high enough to accept the next semiconductor wafer.

When the neural network outputs indicate that an acceptable level of defects in the surface of the liquid has been achieved, the controller 312 may determine that the liquid is ready to receive a subsequent semiconductor wafer. In a general sense, the controller 312 may then control a process involving the liquid in the semiconductor processing chamber based on this determination. As described in greater detail below, controlling the process involving the liquid may include triggering the next wafer to be submerged in the liquid, causing the existing liquid to be cycled out of the chamber and replaced with fresh liquid, generating an alert that the liquid should be changed, controlling a tilt angle/location or of inserting the semiconductor wafer, and/or any other aspect of the semiconductor process.

Figure 6:
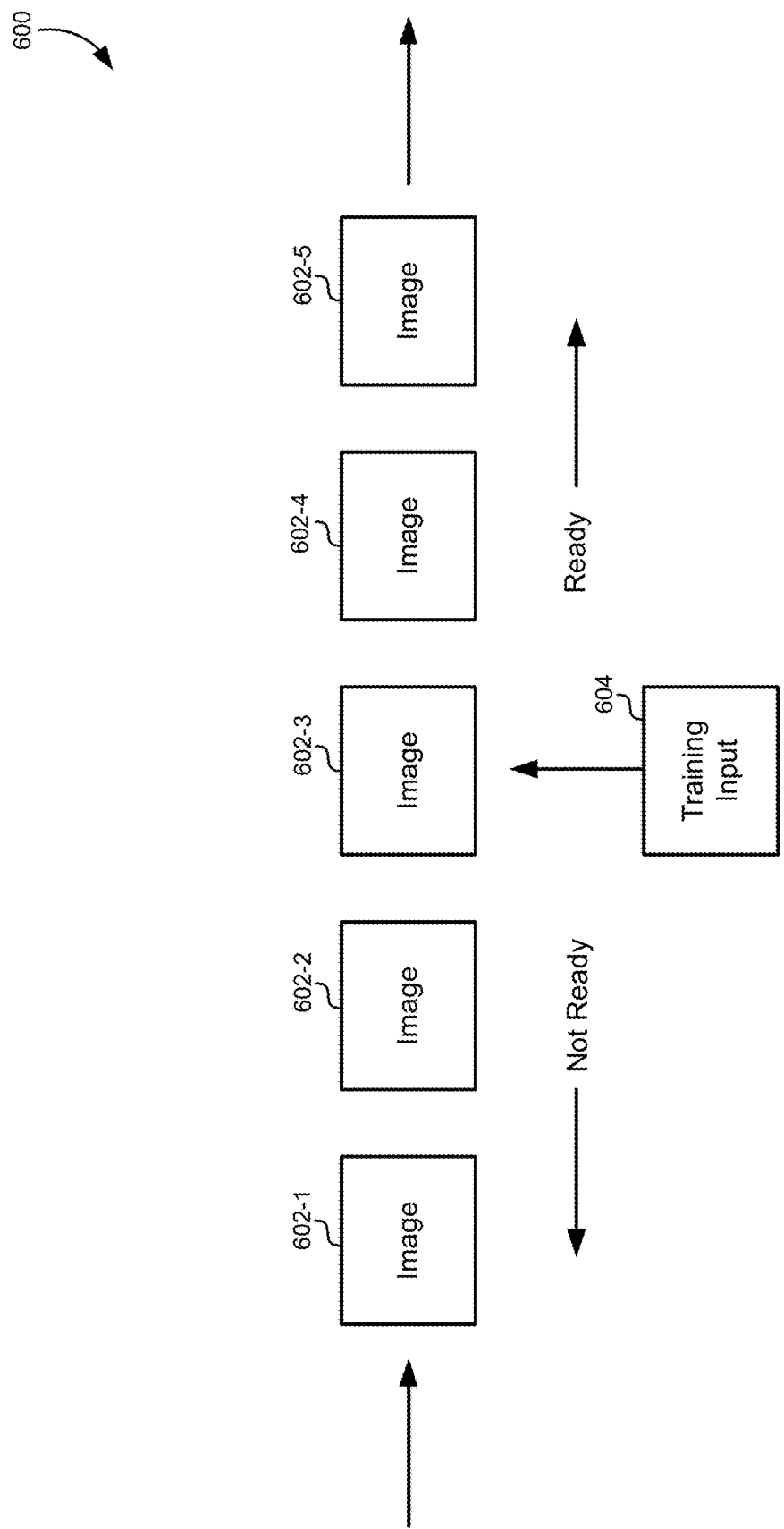
FIG. 6 illustrates how a sequence of images may be labeled and used as training data for the neural network, according to some embodiments.

FIG. 6 illustrates how a sequence of images may be labeled and used as training data for the neural network, according to some embodiments. As described above, images may be captured in real time and processed in real time after the network is trained. In order to generate training data, the sequence of images may also be stored by the controller 312 in a memory device for later or immediate evaluation. For a sequence of images to be used as training data, the images may first be labeled. For example, images may be labeled that include specific defect types, such as bubbles, foam, contaminants, ripples, and so forth, that are present in the image. Some embodiments may also label images as depicting a liquid that is ready or not ready to receive a subsequent semiconductor wafer.

To facilitate the training process, some embodiments may display a sequence of images 602 on a display device. A training input 604 may be received that identifies the first image in the sequence of images 602 that does not contain a specific type of defect in the liquid. For example, when labeling the sequence of images 602 as either depicting or not depicting a bubble in the liquid, the training input 604 may identify image 602-3 as the first image in the sequence of images 602 that has not depicted a bubble in the liquid. Therefore, each of the previous images 602-1, 602-2 in the sequence of images 602 may be labeled as not ready, or as containing the bubble defect. Conversely, the subsequent images 602-4, 602-5, and the image 602-3 identified by the training input 604 may be labeled as ready or not containing the bubble defect. This training process may be used to label each image for each defect type. The training input 604 may be provided by a human operator or by another automated process.

The sequence of images 602 may be part of a library of training data that includes multiple sequences of images that are labeled accordingly. These training data may be provided to the neural network as part of a training process to optimize the parameters of the neural network using techniques such as linear regression to train the neural network to recognize each defect type. In some embodiments, the sequence of images of the liquid used to classify the liquid during a live process may later be used to train the neural network. For example, the images may be evaluated and compared to the results of the neural network during the live process. If there is a discrepancy between the evaluation and the neural network results, the images can be labeled and used as training data to refine the neural network and improve its operation.

Figure 7:
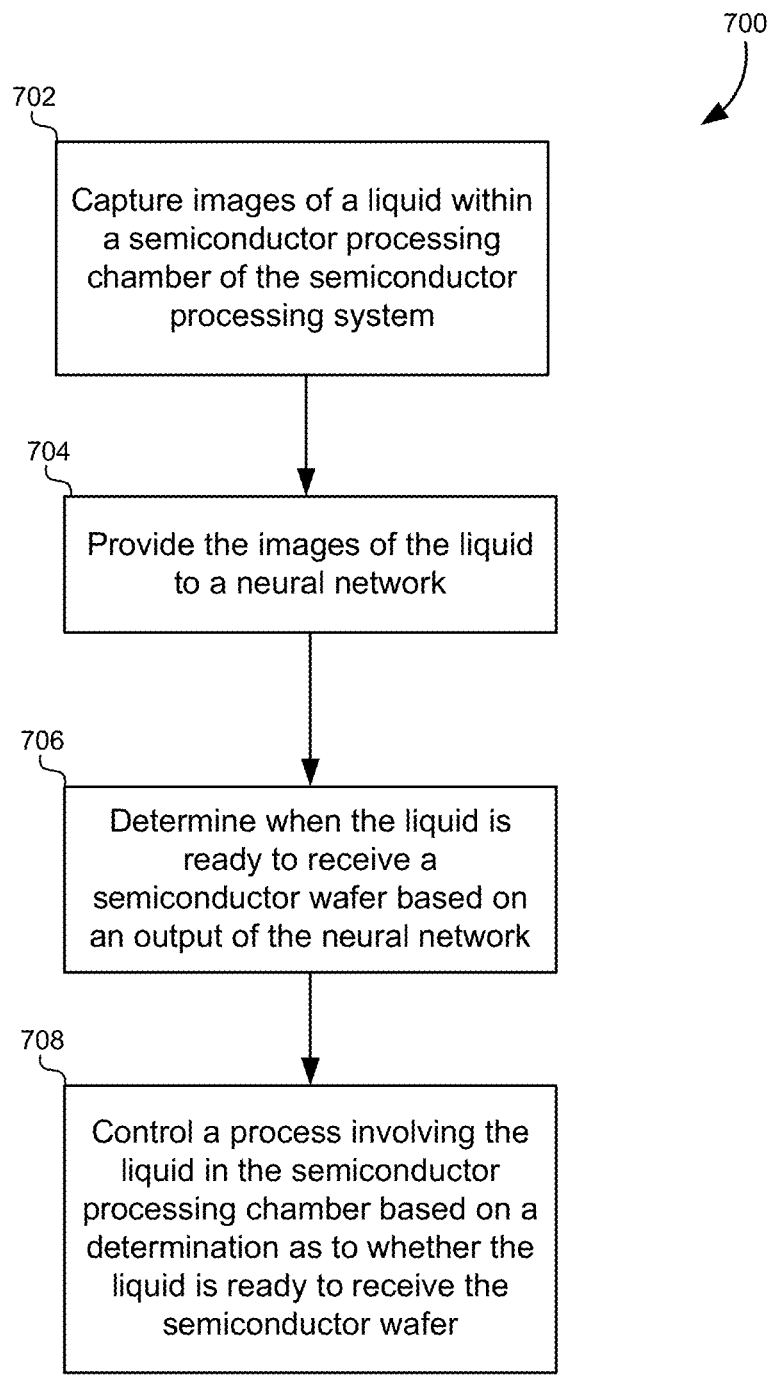
FIG. 7 illustrates a flowchart of a method for operating a semiconductor processing system, according to some embodiments.

FIG. 7 illustrates a flowchart 700 of a method for operating a semiconductor processing system, according to some embodiments. This method may operate the semiconductor processing system using a camera capturing images as described above to optimize the time delay between each successive wafer process in a batch of semiconductor wafers. The method may be carried out by the controller 312 described above or by any other computer system in communication with the semiconductor processing chamber. Although this method may be applied on any chamber that uses an immersive liquid during a semiconductor process, an electrochemical deposition chamber using a liquid electrolyte for electroplating processes is provided only by way of example and is not meant to be limiting.

The method may include capturing images of a liquid within a semiconductor processing chamber of the semiconductor processing system (702). As depicted in FIG. 3, the semiconductor processing chamber may include a window in a housing, and the camera may be positioned outside of the chamber such that the camera captures images of the liquid through the window. The camera may be positioned above a fill level of the liquid as shown in FIG. 3, or at any other location that will provide a view of the liquid. The camera may be positioned such that the camera captures images of the surface of the liquid. The processing chamber may be configured with a chuck or other support structure to remove a previous semiconductor wafer from the liquid, which may cause defects/disturbances in the surface of the liquid, including bubbles, foam, ripples, waves, and so forth. The camera may then be configured to capture images of the liquid after the previous semiconductor wafer is removed from the liquid and stop capturing images when the next semiconductor wafer is submerged in the liquid.

The method may also include providing the images of the liquid to a neural network (704). These images may be transmitted, sequentially, from the camera to a controller as they are captured by the camera. These images may be captured, transmitted, and processed in real time such that there is less than a 1 second delay between when the image is captured and when it is processed by the neural network. The controller may first train the neural network in an off-line training process, then provide each image sequentially as they are received to the inputs of the neural network. The neural network may generate outputs that indicate the presence or absence of one or more defect types as described above.

The method may additionally include determining when the liquid is ready to receive a semiconductor wafer based on an output of the neural network (706). The controller may determine that the liquid is ready by comparing outputs of the neural network to individual thresholds. These thresholds may be set according to the characteristics of each individual processing chamber and a desired level of recovery for the liquid between semiconductor processes. For example, the controller may determine that a predetermined threshold amount of the surface of the liquid is free of bubbles. The controller may determine that a surface of the liquid is substantially free of ripples or waves. The controller may determine that less than a threshold amount of contaminants are visible in the liquid. The controller may also determine that the liquid is above a predetermined threshold level in a container of the semiconductor processing chamber to allow for proper submersion of the wafer.

In response to determining whether the liquid is ready to receive the semiconductor wafer, the method may further include controlling a process involving the liquid in the semiconductor processing chamber (708). The method may control any aspect of the semiconductor process. For example, the controller may trigger the start of the semiconductor process on a subsequent semiconductor wafer by causing the subsequent wafer to be lowered and submerged in the liquid.

In some cases, the determination as to whether the liquid is ready may take too long, thereby indicating a problem with the liquid or the chamber. For example, if the controller is unable to determine that the liquid is ready after a predetermined threshold, such as 120 seconds, the method may control the process by generating an alert to a user interface on the semiconductor processing system indicating that the liquid is unsuitable. Some embodiments may institute a longer delay such that the surface layer of the liquid may drain out of the chamber over the weir to remove bubbles, foam, or contaminants. Some semiconductor chambers may also be configured to flush the liquid and replace it with a new liquid when this alert is triggered. Some systems may allow the controller to change the flow rate of the liquid to cycle the liquid faster when it begins taking longer for the liquid to recover and be ready for the next wafer. This allows the controller to recommend changing the liquid or performing other maintenance proactively before it begins affecting the quality of the semiconductor wafers.

Figure 8A:
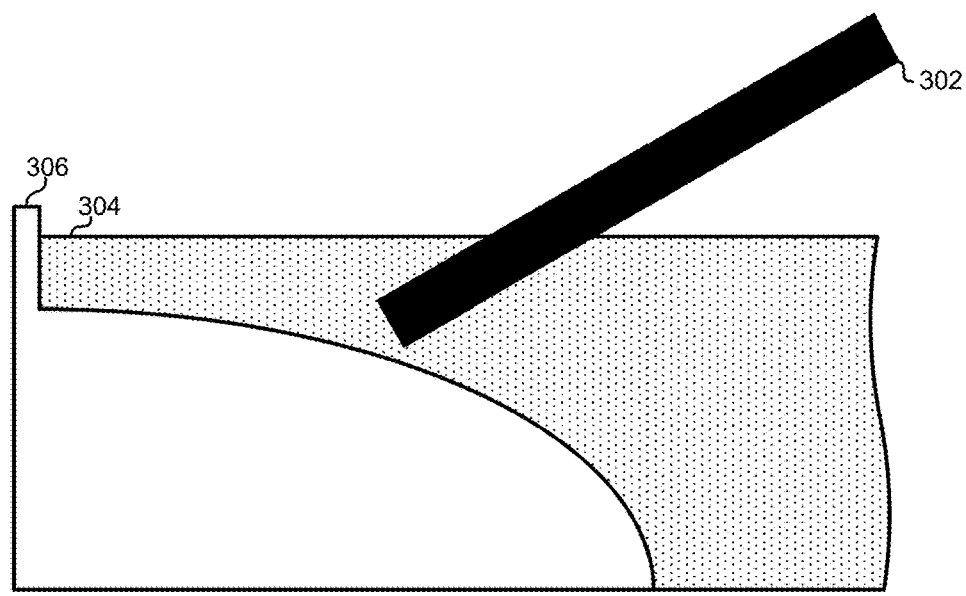
FIGS. 8A-8C illustrate how a process for submerging a subsequent wafer in the liquid may be controlled based on a current height of the liquid, according to some embodiments.
Figure 8B:
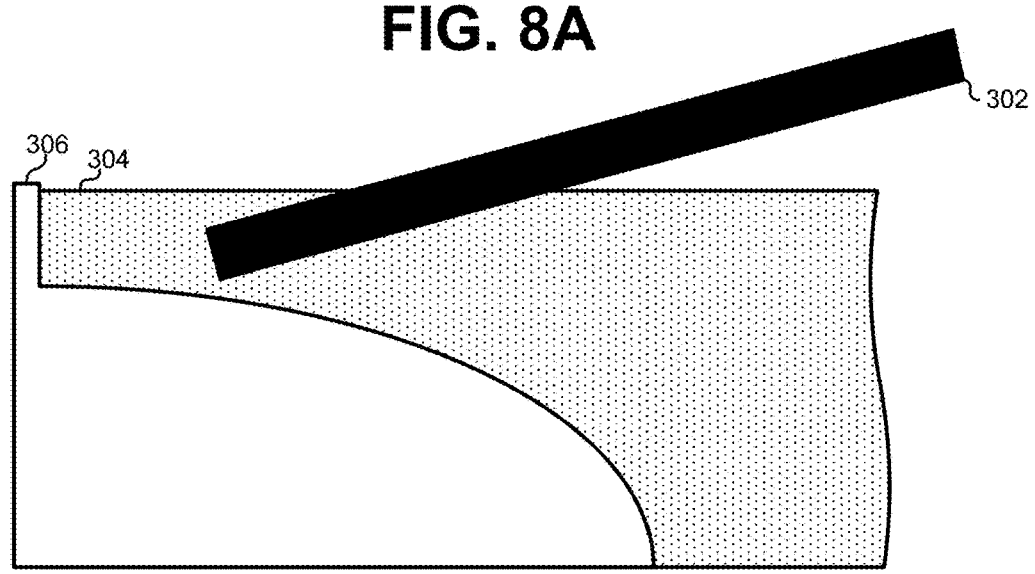
Figure 8C:
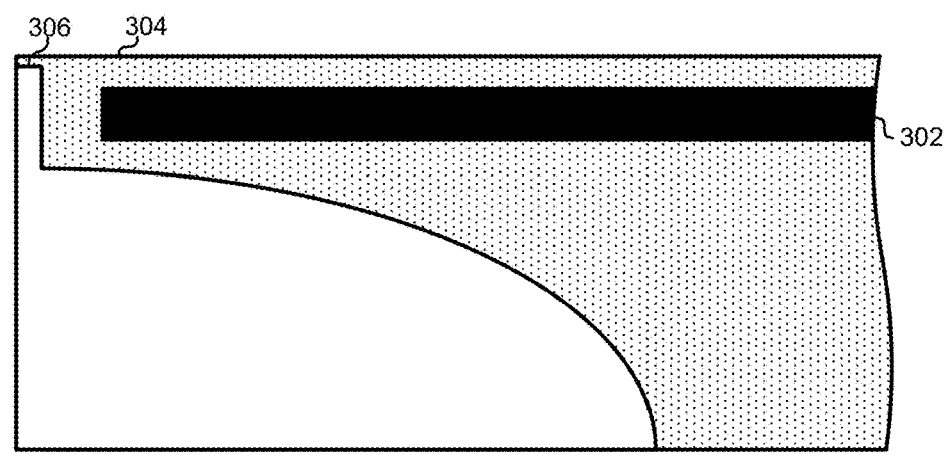

FIGS. 8A-8C illustrate how a process for submerging a subsequent wafer in the liquid 304 may be controlled based on a current height of the liquid 304, according to some embodiments. As described above, the height or level of the liquid 304 in the container may be low when a previous wafer is removed from the liquid 304. As the liquid continues to cycle into the container, it may take time before the liquid has reached the fill level of the weir 306. However, the state of the surface of the liquid 304 may be clear of defects before the liquid 304 reaches the fill level. Thus, there may be instances where the surface of the liquid 304 is ready to receive the next wafer, but the process may still wait until the liquid 304 reaches the fill level.

To minimize this delay, some embodiments may control the process by altering the angle and rotation timing involved with the submersion of the next wafer. As illustrated in FIGS. 8A-8C, some embodiments of the semiconductor processing system may lower the wafer 302 into the liquid 304 at an angle, then rotate the wafer 302 until it is flat in the liquid 304. This process prevents bubbles or contaminants from being trapped underneath the wafer 302 as it is inserted into the liquid 304.

If the surface of the liquid 304 is ready to receive the wafer 302, then the rotation of the wafer 302 may be altered to accommodate a lower level of liquid 304 in the container. For example, if the level of the liquid is lower than the full fill level, the height at which the wafer 302 is rotated to the flat position when being submerged in the liquid may be altered. In other words, the rotation to the flat position may be delayed for the wafer 302 until the leading edge of the wafer 302 has entered the liquid 304 at the lower liquid level. This can ensure that the wafer rotates consistently relative to the current level of the liquid 304, even when the liquid 304 has not completely filled the container.

It should be appreciated that the specific steps illustrated in FIG. 7 provide particular methods of operating a semiconductor processing system to minimize the delay between wafer processes, according to various embodiments. Other sequences of steps may also be performed according to alternative embodiments. For example, alternative embodiments may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. Many variations, modifications, and alternatives also fall within the scope of this disclosure.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 9:
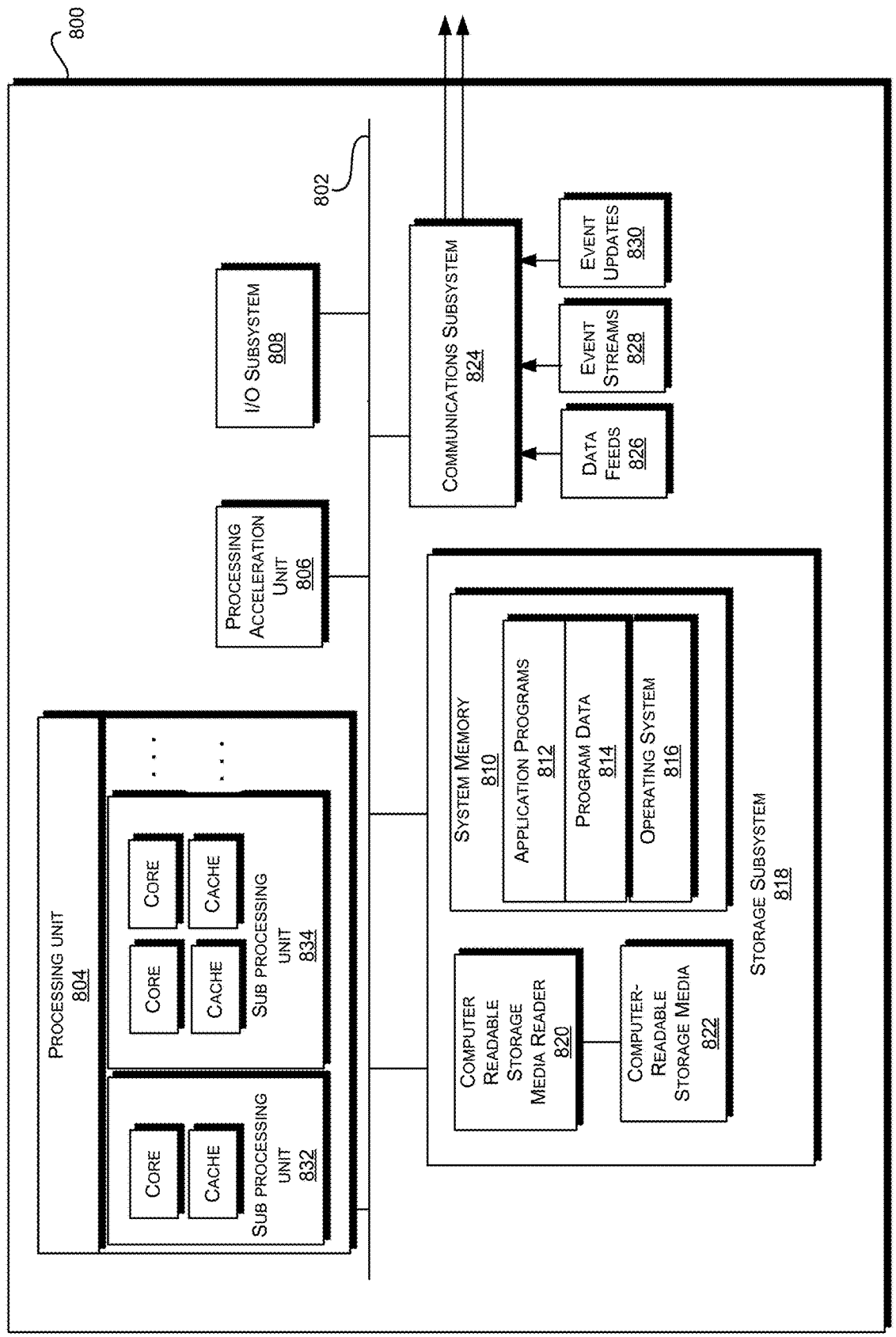
FIG. 9 illustrates an exemplary computer system, in which various embodiments may be implemented.

FIG. 9 illustrates an exemplary computer system 900, in which various embodiments may be implemented. The system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain embodiments, processing unit 904 may be implemented as one or more independent processing units 932 and/or 934 with single or multicore processors included in each processing unit. In other embodiments, processing unit 904 may also be implemented as a quad-core processing unit formed by integrating two dual-core processors into a single chip.

In various embodiments, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that comprises software elements, shown as being currently located within a system memory 910. System memory 910 may store program instructions that are loadable and executable on processing unit 904, as well as data generated during the execution of these programs.

Depending on the configuration and type of computer system 900, system memory 910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 904. In some implementations, system memory 910 may include multiple different types of memory, such as static random access memory (SRAM) or dynamic random access memory (DRAM). In some implementations, a basic input/output system (BIOS), containing the basic routines that help to transfer information between elements within computer system 900, such as during start-up, may typically be stored in the ROM. By way of example, and not limitation, system memory 910 also illustrates application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 918 may also provide a tangible computer-readable storage medium for storing the basic programming and data constructs that provide the functionality of some embodiments. Software (programs, code modules, instructions) that when executed by a processor provide the functionality described above may be stored in storage subsystem 918. These software modules or instructions may be executed by processing unit 904. Storage subsystem 918 may also provide a repository for storing data used in accordance with some embodiments.

Storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for temporarily and/or more permanently containing, storing, transmitting, and retrieving computer-readable information.

Computer-readable storage media 922 containing code, or portions of code, can also include any appropriate media, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 900.

By way of example, computer-readable storage media 922 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some embodiments communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

In some embodiments, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, other ways and/or methods to implement the various embodiments should be apparent.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A semiconductor processing system comprising:
   a semiconductor processing chamber configured to execute a process on a semiconductor wafer that is at least partially submerged in a liquid within the semiconductor processing chamber;
   a camera that is positioned to capture images of the liquid; and
   a controller configured to:
      provide the images of the liquid to a neural network trained to identify defects in a surface of the liquid;
      determine when the liquid is ready to receive the semiconductor wafer and the surface of the liquid has less than a threshold level of defects based on an output of the neural network, wherein the defects comprise ripples or contaminants visible in the liquid; and
      in response to determining that the liquid is ready to receive the semiconductor wafer and the surface of the liquid has less than a threshold level of defects, cause the semiconductor wafer to be at least partially submerged in the liquid.

2. The semiconductor processing system of claim 1, wherein:
   the semiconductor processing chamber comprises a window in a housing of the semiconductor processing chamber; and
   the camera is positioned outside of the semiconductor processing chamber such that the camera captures the images of the liquid through the window in the housing of the semiconductor processing chamber.

3. The semiconductor processing system of claim 1, wherein the camera is positioned above a fill level of the liquid.

4. The semiconductor processing system of claim 1, wherein the camera is positioned to capture the images of a surface of the liquid.

5. The semiconductor processing system of claim 1, wherein the semiconductor processing chamber comprises an electrochemical deposition chamber, the liquid comprises an electrolyte, and the process comprises an electroplating process on the semiconductor wafer.

6. The semiconductor processing system of claim 1, wherein causing the semiconductor wafer to be at least partially submerged in the liquid comprises:
   inserting the semiconductor wafer into the liquid at an angle; and
   determining when to cause the semiconductor wafer to be rotated to a horizontal position.

7. The semiconductor processing system of claim 1, wherein:
   the semiconductor processing chamber is further configured to remove a previous semiconductor wafer from the liquid;
   the camera is configured to capture the images of the liquid after the previous semiconductor wafer is removed from the liquid; and
   the semiconductor processing chamber is further configured to submerge the semiconductor wafer into the liquid in response to the controller determining that the liquid is ready to receive the semiconductor wafer.

8. The semiconductor processing system of claim 1, wherein determining when the liquid is ready to receive the semiconductor wafer comprises:
   determining that more than a predetermined threshold amount of a surface of the liquid is free of bubbles.

9. The semiconductor processing system of claim 1, wherein determining when the liquid is ready to receive the semiconductor wafer comprises:
   determining that the liquid is above a predetermined threshold level in the semiconductor processing chamber.

10. The semiconductor processing system of claim 1, wherein the controller is further configured to:
    cause the liquid to be changed from the semiconductor processing chamber based on the output of the neural network.

11. The semiconductor processing system of claim 1, wherein the neural network comprises a convolutional neural network with one or more convolution filters that are configured to identify images of disturbances on a surface of the liquid.

12. The semiconductor processing system of claim 1, wherein the controller is further configured to:
    control a process involving the liquid in the semiconductor processing chamber based on a determination as to whether the liquid is ready to receive the semiconductor wafer.

13. The semiconductor processing system of claim 1, wherein the images of the liquid are captured at regular intervals of between 1 second and 10 seconds.

14. The semiconductor processing system of claim 1, wherein the controller is further configured to:
    use the images of the liquid to later train the neural network.

15. The semiconductor processing system of claim 1, wherein the controller is further configured to:
    receive a sequence of previous images of the liquid captured after a previous semiconductor wafer was removed from the liquid; and
    train the neural network using the sequence of previous images of the liquid.

16. The semiconductor processing system of claim 15, wherein the controller is further configured to:
    receive an input identifying an image in the sequence of previous images as indicating that the liquid is ready to receive a semiconductor wafer;
    label previous images before the image in the sequence of previous images as indicating that the liquid is not ready to receive the semiconductor wafer;
    label previous images after the image in the sequence of previous images as indicating that the liquid is ready to receive semiconductor wafer; and use the previous images with corresponding labels as training data for the neural network.

* * * * *